United States Patent
Siebert et al.

(10) Patent No.: US 9,193,174 B2
(45) Date of Patent: Nov. 24, 2015

(54) DEVICE AND METHOD FOR IDENTIFYING STACKING AND SPLITTING OF STENOGRAPHIC KEYSTROKES

(75) Inventors: David Siebert, Stuart, FL (US); Portia Seely, Stuart, FL (US)

(73) Assignee: Advantage Technology and Innovations, Inc., Stuart, FL (US)

( * ) Notice: Subject to any disclaimer, the term of this patent is extended or adjusted under 35 U.S.C. 154(b) by 587 days.

(21) Appl. No.: 13/486,686

(22) Filed: Jun. 1, 2012

(65) Prior Publication Data

US 2013/0051887 A1 Feb. 28, 2013

Related U.S. Application Data

(60) Division of application No. 12/266,862, filed on Nov. 7, 2008, now Pat. No. 8,215,853, and a continuation-in-part of application No. 11/077,786, filed on Mar. 11, 2005, now Pat. No. 7,572,078, application No. 13/486,686, which is a continuation-in-part of application No. 11/930,895, filed on Oct. 31, 2007, now Pat. No. 8,096,714.

(60) Provisional application No. 60/552,569, filed on Mar. 12, 2004, provisional application No. 60/855,547, filed on Oct. 31, 2006.

(51) Int. Cl.
B41J 3/26 (2006.01)

(52) U.S. Cl.
CPC .......................................... B41J 3/26 (2013.01)

(58) Field of Classification Search
USPC .......................................................... 400/94
See application file for complete search history.

(56) References Cited

U.S. PATENT DOCUMENTS

| | | |
|---|---|---|
| 2,923,393 A | 2/1960 | Berkelmans |
| 3,557,927 A | 1/1971 | Wright |
| 3,624,645 A | 11/1971 | Gluck et al. |
| 3,644,888 A | 2/1972 | Marino |
| 3,693,184 A | 9/1972 | Maling |
| 3,832,733 A | 8/1974 | Eldridge |
| 3,892,915 A | 7/1975 | Budworth et al. |
| 3,964,062 A | 6/1976 | Flagg |
| 4,195,545 A | 4/1980 | Nishimoto |
| 4,205,351 A | 5/1980 | Michals |

(Continued)

FOREIGN PATENT DOCUMENTS

| | | |
|---|---|---|
| JP | 61129519 | 6/1986 |
| JP | 02017729 | 1/1990 |

(Continued)

*Primary Examiner* — Mila Airapetian
(74) *Attorney, Agent, or Firm* — Mayback & Hoffman, P.A.; Gregory L. Mayback

(57) ABSTRACT

A method, device, and computer program product for analyzing multiple keystrokes in an electronic stenographic recording machine having keys forming stenographic keystrokes when actuated includes sensing a depressed state of at least first and second keys and recording first and second depression times, sensing released states of the first and second keys and recording first and second release times, determining an elapsed depression-release time for each of the first and second stenographic keys, determining a percentage of chronological overlap of each of the elapsed depression-release times, and separating the first and second key depressions into separate stenographic keystrokes when the percentage of chronological overlap indicates a lack of correlation between the first and second key depressions.

20 Claims, 10 Drawing Sheets

(56) References Cited

U.S. PATENT DOCUMENTS

| | | |
|---|---|---|
| 4,379,968 A | 4/1983 | Ely |
| 4,415,283 A | 11/1983 | Smith |
| 4,628,785 A | 12/1986 | Buchla |
| 4,765,764 A | 8/1988 | Lefler |
| 4,891,786 A | 1/1990 | Goldwasser |
| 5,466,072 A | 11/1995 | McCready |
| 6,051,767 A | 4/2000 | Masubuchi |
| 6,204,839 B1 * | 3/2001 | Mato, Jr. ............... 345/168 |
| 6,525,717 B1 | 2/2003 | Tang |
| 6,621,484 B1 | 9/2003 | Yee |
| 7,035,804 B2 | 4/2006 | Saindon |
| 7,403,375 B1 | 7/2008 | Chvojcsek et al. |
| 7,572,078 B2 | 8/2009 | Siebert |
| 2002/0049595 A1 * | 4/2002 | Bennett et al. ............... 704/260 |
| 2005/0201807 A1 | 9/2005 | Siebert |
| 2008/0107465 A1 | 5/2008 | Siebert |
| 2008/0297475 A1 | 12/2008 | Woolf |
| 2008/0316065 A1 | 12/2008 | Maber |
| 2009/0119063 A1 | 5/2009 | Siebert |

FOREIGN PATENT DOCUMENTS

| | | |
|---|---|---|
| JP | 05158603 | 6/1993 |
| JP | 05323988 | 12/1993 |
| JP | 09305286 | 11/1997 |
| JP | 2003076480 | 3/2003 |
| JP | 2006156170 A | 6/2006 |

* cited by examiner

DEVICE AND METHOD FOR IDENTIFYING STACKING AND SPLITTING OF STENOGRAPHIC KEYSTROKES

CROSS-REFERENCE TO RELATED APPLICATION

This application is a:
divisional of U.S. patent application Ser. No. 12/266,862, filed Nov. 7, 2008;
continuation in part of U.S. Pat. No. 7,572,078, issued on Aug. 11, 2009 (which claims the benefit under 35 U.S.C. §119(e) of U.S. Provisional Application No. 60/552,569, filed Mar. 12, 2004); and
a continuation in part of U.S. Pat. No. 8,096,714, issued Jan. 17, 2012 (which application claims the benefit under 35 U.S.C. §119(e) of U.S. Provisional Application No. 60/855,547, filed Oct. 31, 2006),
the complete disclosures of which are hereby incorporated by reference herein in their entirety.

BACKGROUND OF THE INVENTION

Field of the Invention

The invention lies in the field of keystroke devices. In particular, the invention is in the field of computer or stenographic keyboards and methods and software for interpreting keystrokes of these keyboards.

Various keystroke devices exist in the art. The most prevalent keystroke device is a computer keyboard. The keys of a standard computer keyboard are merely switches electronically indicating only a depressed state. Therefore, no signal is output or indicated by the keyboard when a keyboard is at rest, and a signal corresponding to depressed key(s) is output or indicated only when at least one key is depressed sufficiently far to "set off" the switch of that key or the switches of that set of keys.

A typewriter also has a keyboard, which can be mechanical and/or electronic. Like the computer keyboard, actuation (e.g., depression) of a key is intended to print a character. In electronic typewriters, when a key is actuated sufficiently far, a signal is sent to a processor to have the corresponding key(s) printed on the typing medium (e.g., paper). Mechanical typewriters are similar to electronic typewriters, but with one significant difference. Mechanical typewriters connect the key of the keyboard directly to the hammer containing the corresponding character to be printed on the page. Such a connection typically places the key at the end of a lever connected to a fulcrum and, when the lever is depressed at a proximal end, the distal end of the lever forcibly contacts or causes a hammer to pivot its distal end towards the page. A printing ribbon is disposed between the page and the end of travel of the hammer and a character formed at the end of the hammer is printed on the paper because the raised character presses the printing ribbon against the page. Because such an assembly is a mechanical connection dependent upon the pressure imparted by the user, the hammer can hit the page with varying degrees of force. A relatively hard contact produces a clearly printed character on the page. In contrast, a relatively soft contact may produce a lightly printed character, which also can be referred to as a "shadow." For mechanical typewriters, it is more desirable to have clearly printed characters than to have shadow characters. Therefore, improvements were made over the history of mechanical typewriters to guarantee relatively uniform contact between the hammer and the page, which improvements were, thereafter, incorporated into most electronic typewriters.

Another keystroke device can be found on stenographic devices. The most modern stenographic devices are entirely electronic and virtually immediately translate the stenographic key actuations into an accurate written representation of the spoken word. These modern devices are analogous to the electronic typewriters and computer keyboards in that a specific actuation of a key or set of keys will cause a clear printing or storage of the corresponding character or set of characters. Insufficient depression of a key(s) will not generate any output. Alternatively, depression of a set of keys (which is common for stenographic dictation) where one or more keys is sufficiently actuated but one or more other key(s) is insufficiently actuated will generate an output that does not correspond to the stenographers' intended output. Thus, the stenographer or computer associated with the stenographic device might not be able to accurately translate the inadequately actuated key(s) depending upon what was actually output to the paper or the electronically stored file.

The earlier stenographic devices provided an advantage over the modern stenographic devices. The older devices gave a stenographer some ability to determine a correct output from an incorrect input because these older mechanical devices printed the output on the paper in varying degrees of lightness. Stenographers refer to a lightly printed output as "shadow" output. So, if an intended output was lightly printed on the stenographic paper, that stenographer might have been able to determine what was intended during the original dictation and correctly translate the spoken word in the final transcript. Modern stenographic devices, however, are not able to electronically understand or store shadow output. If the stenographer does not actuate a key adequately, then no output is generated. And, if keys of a set of keys are actuated in varying degrees, then incorrect output is transcribed.

Problems stenographers have faced for many years are referred to as "stacking" and "splitting." Either "stacking" or "splitting" results when a reporter presses several keys simultaneously and not all keys make contact with the sensing mechanism at the same time or are released at the same time. Stacking refers to a situation where multiple keys are pressed at the same or substantially the same time and are erroneously recorded as a single keystroke. Splitting refers to a situation where one keystroke is recorded as two keystrokes.

Since traditional keyboards can only record "on" and "off" values, the prior art has relied on simple timing algorithms to try to minimize stacking problems. More advanced versions of stenographic software provide "anti-stacking" algorithms. However, presently-known algorithms can cause the opposite problem to occur, i.e., splitting.

Therefore a need exists to overcome the problems with the prior art as discussed above.

SUMMARY OF THE INVENTION

The invention provides a device, method, and computer program product for identifying stacking and splitting of stenographic keystrokes that overcomes the hereinaforementioned disadvantages of the heretofore-known devices and methods of this general type and that correctly groups or separates stenographic keystrokes having some amount of depression overlap.

With the foregoing and other objects in view, there is provided, in accordance with the invention, a method for analyzing multiple keystrokes in an electronic stenographic recording machine having keys forming stenographic keystrokes when actuated, which comprises sensing a depressed state of a first stenographic key and recording a first depression time, sensing a depressed state of a second stenographic key and recording a second depression time, sensing a released state of the first stenographic key and recording a first release time, sensing a released state of the second stenographic key and recording a second release time, determining an elapsed depression-release time for each of the first and second stenographic keys, determining a percentage of chronological overlap of each of the elapsed depression-release times, and separating the first and second key depressions into separate stenographic keystrokes when the percentage of chronological overlap indicates a lack of correlation between the first and second key depressions.

In accordance with another mode of the invention, there is provided the step of defining the first and second key depressions as a single stenographic keystroke when the percentage of chronological overlap indicates correlation.

In accordance with a further mode of the invention, there is provided the steps of sensing a depressed state of a third stenographic key and recording a third depression time, sensing a released state of the third stenographic key and recording a third release time, sorting the first, second, and third depression times based on a chronological order of occurrence, determining, within the sorted depression times, a pair of chronologically adjacent depression times with a greatest chronological variation therebetween, determining an elapsed depression-release time for each one of the determined pair of adjacent depression times, and carrying out the separating step by separating the first, second, and third key depressions into one of three separate stenographic keystrokes when the percentage of chronological overlap indicates a lack of correlation for all of the first, second, and third key depressions and two separate stenographic keystrokes when the percentage of chronological overlap indicates correlation among two of the first, second, and third key depressions and a lack of correlation by one of the first, second, and third key depressions.

In accordance with an added mode of the invention, the first, second, and third key depressions are defined as a single stenographic keystroke when the percentage of chronological overlap indicates correlation among all of the first, second, and third key depressions.

In accordance with an additional mode of the invention, the separating step is carried out to create the two separate stenographic keystrokes by forming a first of the two separate stenographic keystrokes from the keys having the depressed state chronologically preceding and including the key with the earlier one of the pair of chronologically adjacent depression times and forming a second of the two separate stenographic keystrokes from the keys having the depressed state chronologically following and including the key with the later one of the pair of chronologically adjacent depression times.

In accordance with yet another mode of the invention, the depressed state is entered when a depressed one of the keys travels downward past a respective registration point.

In accordance with yet a further mode of the invention, the released state is entered when a released one of the keys travels upward past the respective registration point.

In accordance with yet an added mode of the invention, the depressed and released states are determined at least in part by an optical sensor.

With the objects of the invention in view, there is also provided a method for analyzing multiple keystrokes in an electronic stenographic recording machine having keys forming stenographic keystrokes when actuated, the method comprising recording a plurality of downward time markers, each of the downward time markers indicating a time when a different one of at least three stenographic keys moves downward past a respective stenographic key registration point, recording a plurality of upward time markers, each of the upward time markers indicating a time when a different one of the at least three stenographic keys moves upward past its respective key registration point to register a respective key stroke, chronologically sorting the downward time markers, determining, within the plurality of sorted downward time markers, a pair of chronologically adjacent downward time markers with a greatest chronological difference therebetween, determining an elapsed time for each one of the determined pair of adjacent downward time markers, the elapsed time being defined to start when a respective one of the stenographic keys moves downward past its registration point and to end when the respective one stenographic key moves upward past its registration point, determining a percentage of chronological overlap of the determined elapsed times, and separating the at least three key strokes into at least two separate stenographic keystrokes when the percentage of chronological overlap indicates a lack of correlation among the at least three key strokes.

In accordance with yet an additional mode of the invention, the at least three key strokes is defined as a single stenographic keystroke when the percentage of chronological overlap indicates correlation among all of the at least three key strokes.

In accordance with again another mode of the invention, the stenographic key registration point is between a fully released state and a fully depressed state of a key.

In accordance with again a further mode of the invention, there is provided the step of sensing one of the at least three stenographic keys moving past its registration point with an optical sensor.

In accordance with again an added mode of the invention, the separating step is carried out by forming a first of the two separate stenographic keystrokes from the keys having the downward time marker chronologically preceding and including the key with the earlier one of the pair of chronologically adjacent downward time markers and forming a second of the two separate stenographic keystrokes from the keys having the downward time marker chronologically following and including the key with the later one of the pair of chronologically adjacent downward time markers.

With the objects of the invention in view, there is also provided a computer program product for analyzing multiple keystrokes in an electronic stenographic recording machine having keys forming stenographic keystrokes when actuated, the computer program product comprising a non-transitory storage medium readable by a processing circuit and storing instructions for execution by the processing circuit for performing a method comprising recording a plurality of downward time markers, each of the downward time markers indicating a time when a different one of at least three stenographic keys moves downward past a respective stenographic key registration point, recording a plurality of upward time markers, each of the upward time markers indicating a time when a different one of the at least three stenographic keys moves upward past its respective key registration point to register a respective key stroke, chronologically sorting the downward time markers, determining, within the plurality of sorted downward time markers, a pair of chronologically adjacent downward time markers with a greatest chronological difference therebetween, determining an elapsed time for each one of the determined pair of adjacent downward time markers, the elapsed time being defined to start when a respective one of the stenographic keys moves downward past its registration point and to end when the respective one stenographic key moves upward past its registration point, determining a percentage of chronological overlap of the determined elapsed times, and separating the at least three key strokes into at least two separate stenographic keystrokes when the percentage of chronological overlap indicates a lack of correlation among the at least three key strokes.

In accordance with again an additional mode of the invention, the method further comprises defining the at least three key strokes as a single stenographic keystroke when the percentage of chronological overlap indicates a correlation among all of the at least three key strokes.

In accordance with still another mode of the invention, each registration point is between a fully released state and a fully depressed state of a key.

In accordance with still a further mode of the invention, the method further comprises carrying out the separating step by forming a first of the two separate stenographic keystrokes from the keys having the downward time marker chronologically preceding and including the key with the earlier one of the pair of chronologically adjacent downward time markers and forming a second of the two separate stenographic keystrokes from the keys having the downward time marker chronologically following and including the key with the later one of the pair of chronologically adjacent downward time markers.

With the objects of the invention in view, there is also provided an electronic stenographic recording machine comprising a set of stenographic keys operable to form stenographic keystrokes when actuated, a memory, a processor, and a sensor communicatively coupled to at least one of the memory and the processor. The sensor is operable to sense a depressed state of a first stenographic key in the set of stenographic keys and cause the processor to store a first depression time in the memory, sense a depressed state of a second stenographic key in the set of stenographic keys and cause the processor to store a second depression time in the memory, sense a released state of the first stenographic key and cause the processor to store a first release time in the memory, and sense a released state of the second stenographic key and cause the processor to store a second release time in the memory. The processor is operable to determine an elapsed depression-release time for each of the first and second stenographic keys, determine a percentage of chronological overlap of the elapsed depression-release times, and separate the first and second key depressions into two separate stenographic keystrokes when the percentage of chronological overlap indicates a lack of correlation between the first and second key depressions.

In accordance with still an added mode of the invention, the processor is further operable to define the first and second key depressions as a single stenographic keystroke when the percentage of chronological overlap indicates correlation between the first and second key depressions.

In accordance with a concomitant mode of the invention, the sensor is operable to sense a depressed state of a third stenographic key in the set of stenographic keys and cause the processor to store a third depression time in the memory, and sense a released state of the third stenographic key and cause the processor to store a third release time in the memory, and the processor is further operable to sort the first, second, and third depression times based on a temporal order of occurrence, determine, within the plurality of sorted depression times, a pair of chronologically adjacent depression times with a greatest chronological variation therebetween, determine an elapsed depression-release time for each one of the determined pair of adjacent depression times, and to carry out the separating step by separating the first, second, and third key depressions into at least two separate stenographic keystrokes when the percentage of chronological overlap indicates a lack of correlation among the first, second, and third key depressions.

Other features that are considered as characteristic for the invention are set forth in the appended claims.

Although the invention is illustrated and described herein as embodied in a device and method for identifying stacking and splitting of stenographic keystrokes, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DETAILED DESCRIPTION OF THE INVENTION

Figure 1:
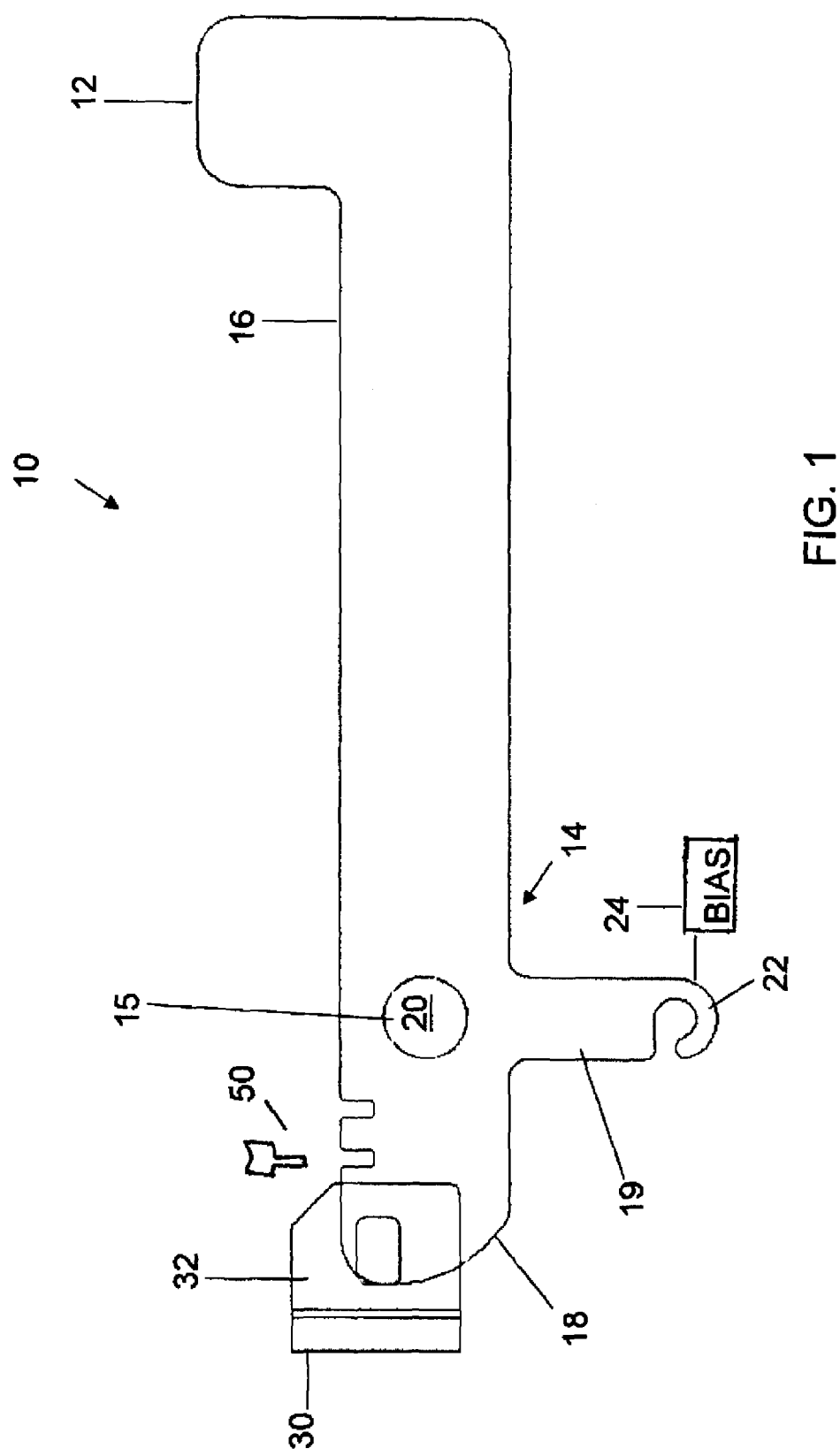
FIG. 1 is a fragmentary, side elevational view of one embodiment of a keystroke device according to the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. A "storage medium," as used herein, is defined as any medium that is readable by a computer or computer controlled device and capable of storing a computer instruction or computer-readable data.

Figure 2:
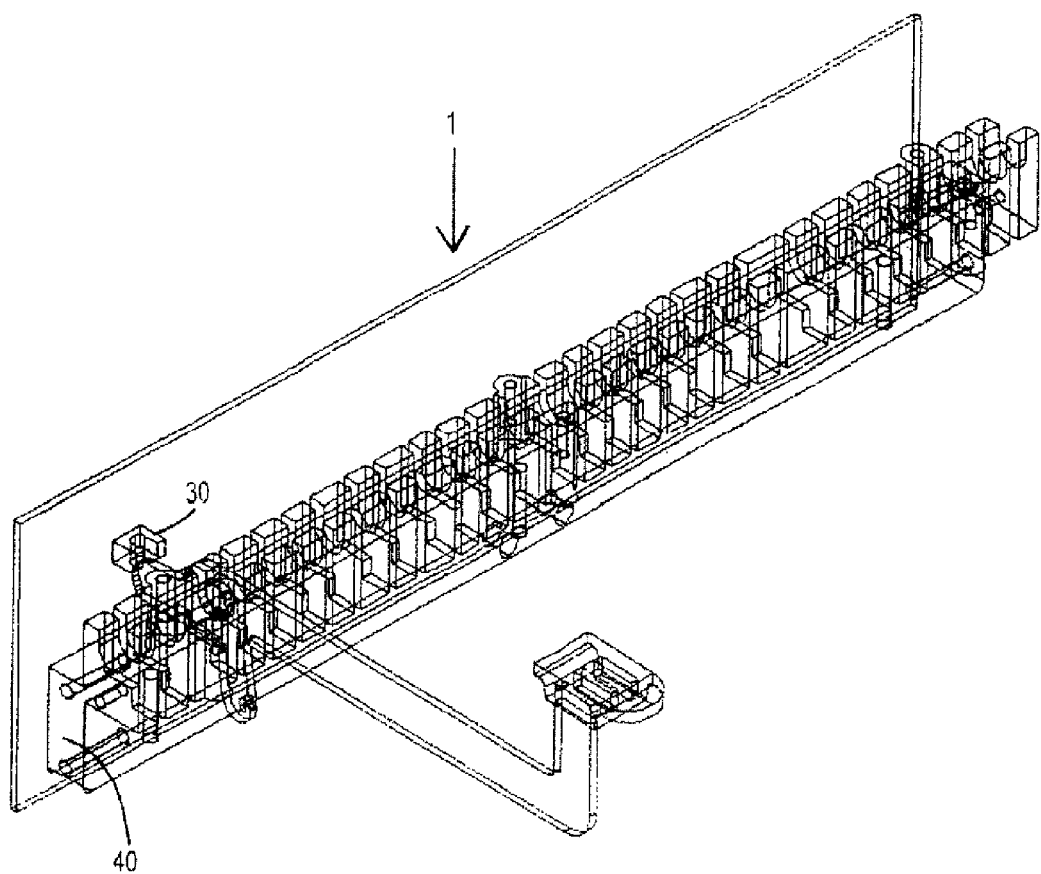
FIG. 2 is a wire-frame perspective view of a machine having a key-retaining device for receiving a plurality of the keystroke device of FIG. 1.
Figure 3:
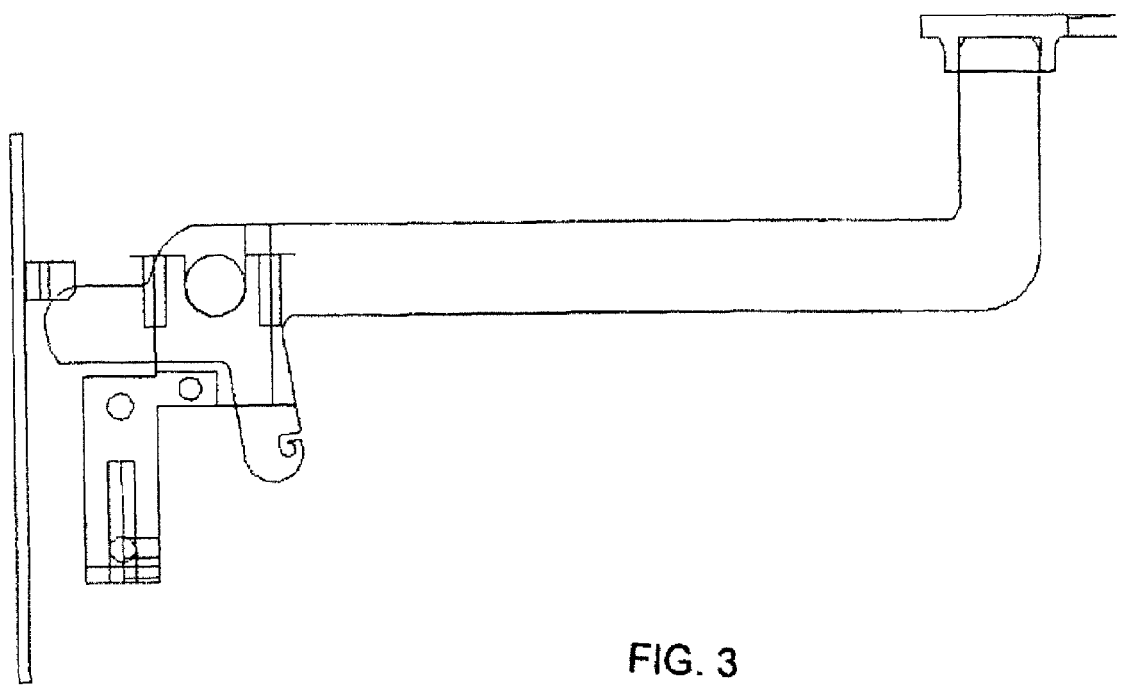
FIG. 3 is a wire-frame side elevational view of the machine, the key-retaining device, and the keystroke device of FIG. 2.
Figure 4:
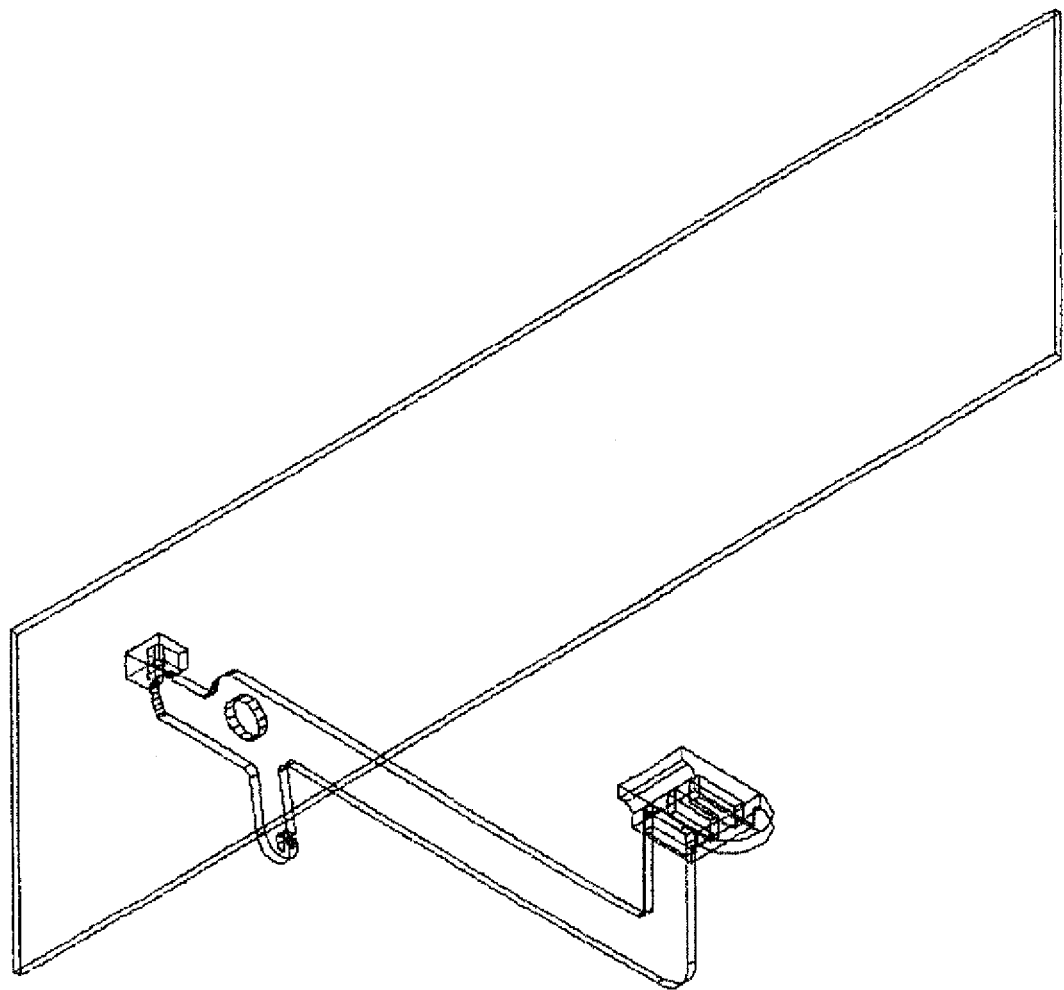
FIG. 4 is a wire-frame perspective view of the machine and the keystroke device of FIG. 2 without the key-retaining device.
Figure 5:
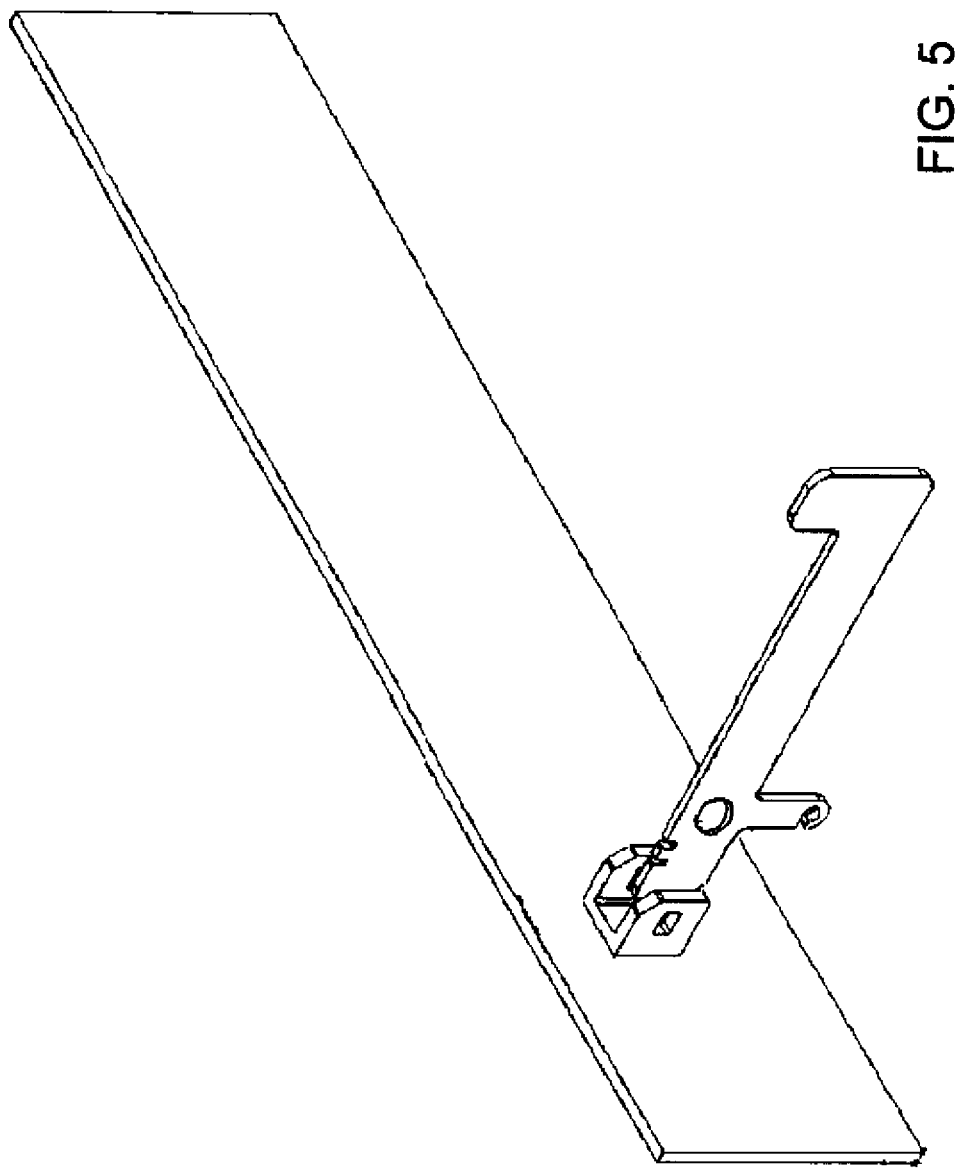
FIG. 5 is a perspective view of the machine and the keystroke device of FIG. 2 without the key-retaining device.

Referring now to the figures of the drawings in detail and first, particularly to FIG. 1 thereof, there is shown a single keystroke device 10 to be used in a keyboard of some kind. The keystroke device 10 has a contact area 12 at which a user imparts the force for activating the keystroke device 1. The contact area 12 is connected to a proximal portion 16 of a key lever 14. The key lever 14 is connected movably to a key-retaining device 40 (see FIG. 2) at a pivot point 20. The key lever 14 defines a pivot area 15 disposed between a distal portion 18 of the key lever 14 and the proximal portion 16 of the key lever 14. The key lever 14 has a bias extension 19 (also referred to as a cam lever) for receiving a force that will be imparted upon the key lever 14 to keep the contact area 12 raised, i.e., in a non-actuated position.

In the embodiment shown in FIGS. 1 to 5, the bias extension 19 has, at a distal end thereof, a hook 22 to be inserted through an end ring of a bias device 24, e.g., a spring, illustrated only diagrammatically in FIG. 1. To impart a raising force to the key lever 14, the spring is oriented so that the force imparted on the bias extension 19 rotates the proximal portion 16 counter-clockwise with respect to FIGS. 1 to 5 about the pivot point 20. The bias extension 19 and hook 22 shown in FIGS. 1 to 5 is only an exemplary embodiment for keeping the keystroke device 1 in a non-actuated position. The configuration of the bias extension 19 can take any form and the direction of force imparted by biasing spring can be in any direction so long as the contact area 12 is raised when not activated and biases the key to the raised position after being actuated. (The described configuration, of course, assumes that the keystroke device 10 is to be actuated by a lowering movement. Force in the opposite direction applies if the keystroke device 10 is to be lifted by a user.)

To communicate an actuation of the contact area 12 by a user to electronics of machine 1 in which the keystroke device 10 resides, the machine 1 has a switch or contact 50. The contact 50 can take any form so long as a given actuation of the contact area 12 imparts a sufficient force to the contact 50 to indicate that a user wants the corresponding function of the keystroke device 10 to be activated (e.g., to print a character on a page and/or to store a character in an electronic file). The contact 50 can be merely a conducting contact surface that completes an electrical circuit when the keystroke device 1 is fully actuated or it can be a piston or lever that is depressed to actuate a switch physically when the keystroke device 1 is fully actuated. Therefore, it is not necessary to illustrate the contact 50 other than diagrammatically.

To sense a depression depth of the contact area 12, a sensor 30 is disposed somewhere at the lever 14 such that the sensor 30 can detect how far the contact area 12 has been depressed. The sensor 30 can be disposed anywhere with regard to any portion (16, 18, 19) of the lever so long as it can detect movement of the lever 14. In a preferred embodiment, however, the sensor 30 is disposed adjacent the distal portion 18 and on a side of the pivot point 20 opposite the proximal portion 16. In this preferred embodiment, to keep movement of the segment of the distal portion 18 with respect to the sensor 30 linear, the measuring surface of the distal portion 18 (top surface in FIG. 1) has a longitudinal extent that passes directly through the center of the pivot point 20. It is noted that if the sensor 30 can detect all of the desired number of movement "levels" from non-depression of the lever 14 to full depression of the lever 14, then the contact 50 is rendered unnecessary.

For purposes of illustration, the sensor 30 in FIG. 1 has a circular cutout 32. Therefore, in the view of FIG. 1, the distal portion 18 can be seen through the cutout "window." The position of the lever 14 in FIG. 1 is shown blocking approximately half of the window. Accordingly, if a light were placed on one side of the distal portion 18 and a light-detector was placed on the other side of the distal portion 18, then the amount of light received by the detector would be approximately half of the amount received when the distal portion 18 was not blocking any part of the window.

Figure 6:
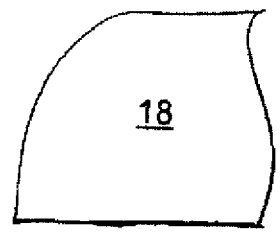
FIG. 6 is a fragmentary side elevational view of a first embodiment of a distal end of a distal portion of the keystroke device of FIG. 1.
Figure 7:
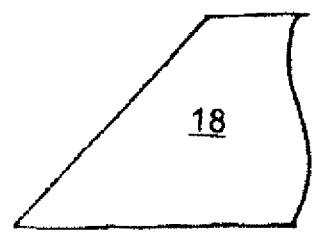
FIG. 7 is a fragmentary side elevational view of a second embodiment of the distal end of the distal portion of the keystroke device of FIG. 1.
Figure 8:
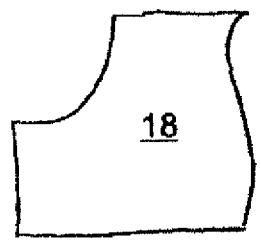
FIG. 8 is a fragmentary side elevational view of a third embodiment of the distal end of the distal portion of the keystroke device of FIG. 1.

The sensor 30 can detect movement of the distal portion 18 in any number of ways. In the preferred embodiment shown in FIG. 1, the distal portion 18 blocks a non-illustrated light source of the sensor to vary an amount of light, the variance being proportional to a displacement of the contact area 12 by a user. Blocking of the light source is dependent upon the shape of distal portion 18. FIGS. 6, 7, and 8 illustrate three exemplary embodiments for the distal end (furthest from the pivot point 20) of the distal portion 18. When the distal portion 18 is curved as diagrammatically illustrated in FIG. 6, the light source is blocked in a linear manner. In comparison, when the distal portion 18 is linear, as shown in FIG. 7, the light source is blocked in an exponential manner. Finally, when the distal portion 18 is curved as shown in FIG. 8, the light source is blocked in a non-linear manner.

The embodiment in FIG. 1 has a distal portion 18 with the shape corresponding to FIG. 6. Thus, the light detected by the sensor 30 will be directly proportional to the travel of the proximal portion 16. From the detected light, the sensor 30 (or the detector of the sensor 30) can output a signal (e.g., a voltage level) dependent upon the movement of the distal portion 18. Such a signal can be processed to allow the machine 1 to not only register a keystroke, but also to register a partial-keystroke, i.e., a shadow. If an evenly and equally separate number of shadow levels are desired, then a linear output is preferred.

It is noted that the sensor 30 need not be placed at the distal portion 18 as illustrated in FIGS. 1 to 5. Instead, the sensor 30 can be positioned at the proximal portion 16. For example, if the sensor 30 is disposed above the proximal portion 16 as viewed in FIG. 1, then a rest position of the lever 14 places the proximal portion 16 to completely cover the window 32 of the sensor 30, and depression of the lever 14 moves the proximal portion 16 away from the window 32 to uncover the light source and allow light to be detected in an increasing manner the further the lever 14 is depressed.

In an embodiment of the sensor 30 where an analog voltage is output, a depth of the keystroke is registered by a change in the value of the analog voltage, which voltage is controlled by the distal portion 18, attached to or integral with the key arm, selectively interrupting the optical receiver. When such an analog signal is provided, the sensor 30 can be connected to a downstream analog-to-digital converter for later digital interpretation of the level of the light received.

Other possible options for detecting a position of the lever 14 exist. For example, the depth of a keystroke can be registered with a digital decoder directly connected to the lever 14. Such a decoder outputs a direct digital value dependent upon depth of the keystroke. Because the decoder is digital, the internal algorithm can, through appropriate software, make the output digital value change in any desired manner—linearly, exponentially, or otherwise—dependent upon the recorded depth of the keystroke.

Also, processing can include an algorithm that allows the user to selectively change/adjust the range and/or the number of levels of the output signal. An input device can be provided to give the stenographer a user-customized interpretation of a full key actuation, a partial key actuation, and/or any number of levels between no actuation and full actuation. The customizing input can be provided through appropriate manipulation of a physical item (a dial) or by executing a software program that controls the processing of the electrical input signal corresponding to the key actuation depth.

Alternatively, instead of generating more than two levels of a keystroke as set forth above, the sensor 30 can merely output two levels. In a first embodiment, the sensor 30 can output two levels corresponding to a partial key actuation (a shadow) and a full key actuation. In this configuration, a switch 50 is unnecessary. In a second embodiment, the sensor 30 can be, for example, a three-part system with two switches 50: a first of the switches registering a partial key actuation; and a second of the switches registering a complete key actuation, or, the switch 50 can be a single two-level switch.

The sensor can also have the capability of using an optical encoding wheel to measure the key throw. For example, an encoder can be used to produce a pulse when the wheel (operatively connected to the lever 14) moves a given distance. Also, a focused light beam can be used to count rotations of the encoder wheel.

Varying degrees of movement of the lever 14 can also be detected using a resistive device, e.g., a resistor network or a potentiometer, with the depth of the keystroke being dependent upon a resistance presented by the device to a resistance measuring circuit. An accelerometer can also be used to detect the depth of the keystroke.

The above embodiments relate to the mechanics of the keystroke device 10 according to the invention. Once the sensor 30 generates the electrical output signal, this signal can be supplied to a processor P for evaluation.

Emulation of the appearance of a printed stenographic output with a paperless electronic stenotype machine having an electronic display (e.g., LED, LCD, Flat Panel) can occur by electrically supplying depth information for each key pressed by the user in addition to the electronic data corresponding to the particular stenographic stroke, also sometimes referred to herein as a "word". When a stroke is registered but is within a specified range less than a full depth of the stroke, the stroke can be stored electronically as a shadow. If, for example, ten values of shadow can be detected (or are programmed to be detectable), those values can be assigned to a specific level of brightness (e.g., in a look-up table or programmed in an EEPROM or stored in a flash RAM, hard drive, or static RAM) or, instead of a look up table, an equation can be used to shift the depth value byte four bits to get an intensity scale. Thus, the shadow will display on the output screen as characters lighter than a non-shadowed character. Instead of using merely brightness of the character(s) as the visible indicator, the shadow can also be varied using a difference in color, font, or other display attribute, or even by a combination of different display attributes.

Figure 9:
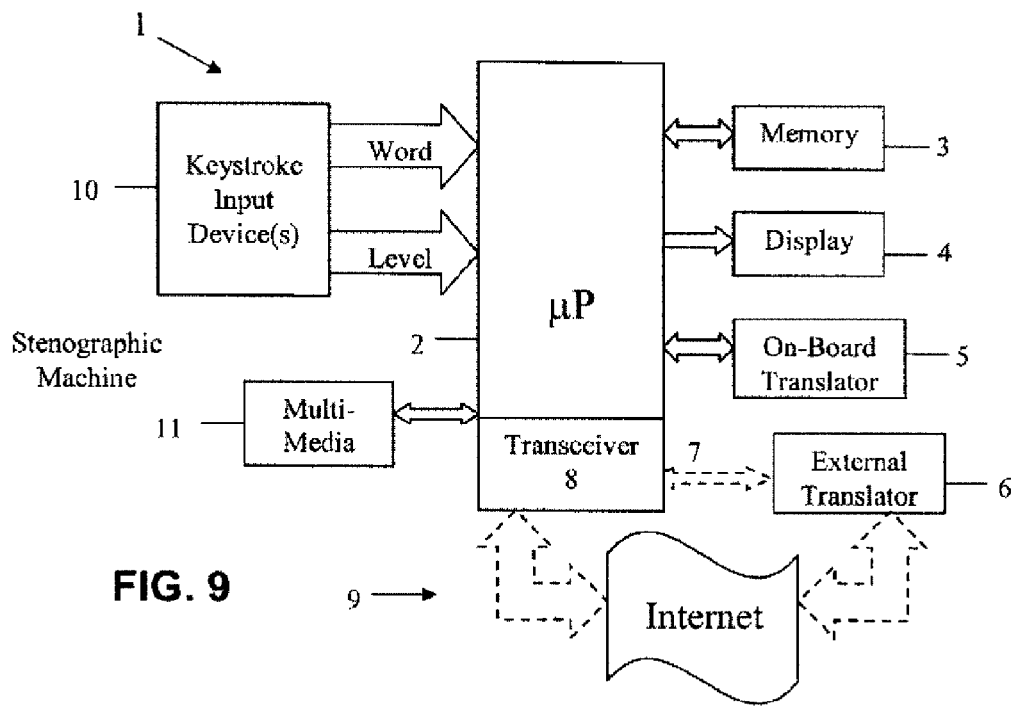
FIG. 9 is a block circuit diagram of a stenographic system according to the invention.

FIG. 9 is a block circuit diagram of a stenographic device according to the invention. The stenographic machine 1 has a plurality of keystroke devices 10, which are connected to an on-board microprocessor 2. A memory 3 (e.g., RAM, ROM, hard drive, removable memory) is connected to the microprocessor 2 for storing data and supplying stored data to the microprocessor 2. A display 4 is connected to the microprocessor 2 for displaying stenographic and/or translated data and for displaying the shadows determined/detected by the microprocessor 2. The microprocessor 2 controls all electronic operations including receiving stenographic data and shadow data, storing all data, and displaying all desired processes, which processes can include the stenographic and/or level data itself, indications that data is being stored, indications that data is being translated, translated stenographic output, and many others.

Depending upon the configuration of the stenographic device, a translator 5 can be on-board the device and, therefore, it is directly connected to the microprocessor 2 for translating stored or incoming (real-time) stenographic data. Thus, input electronics for the keystroke device can be directly connected to the same processor 2 that controls the translation program, and the functions of input, shadow determination, translation, and correction/editing can be performed on a single unit 1.

If the translator is not on board the stenographer's device 1, then the device 1 can be connected to an external stenographic translator 6, in which case the translator 6 is separate from the stenographic device 1 and information stored in the memory 3 is relayed 7 either by transfer through an intermediate media (e.g., floppy disk, micro-drive), in which case the device will have a floppy drive, USB port, IEEE 1394 port, etc., or wirelessly through some kind of communication data link (e.g., a Bluetooth, ISDN, Internet, or other wired or wireless data link), in which case the device will have an on-board transceiver 8.

In either case, the translator 5, 6 translates the stenographic data to the respective language (e.g., English). When the device 1 is associated directly with a translation system, translation occurs quickly so that the stenographer can view his/her stenographic keystrokes in almost real-time and in relatively understandable English (dependent upon the quality of the word/translation processor). The memory 3 will store the translation locally 3, 11 and/or externally 7, 9.

FIG. 9 further illustrates the stenographic device 1 and an embodiment 9 for connecting the device to an external stenographic translator 6. In the example of FIG. 9, the translator 6 is connected to the Internet and is housed at a location different from the stenographer's location. In such a networked configuration, the transceiver 8 can utilize a bi-directional data channel to transmit the un-translated stenographic data to the external translating computer 6 (represented by the dashed arrows), whether in real time or delayed. The translating computer 6 can, then, translate the stenographic data and transmit a translated data stream back to the device immediately or at a later time and to any other device that can be connected (directly or wirelessly) to the translating computer (also represented by the dashed arrows). Thus, the stenographer can have almost real-time analysis even without having an on-board translator.

One example of such a system 9 provides the stenographic device 1 with a connection (e.g., a direct or wireless transceiver 8) to the Internet and the external translating computer 6 with a connection (direct or wireless) also to the Internet. Thus, commonly available Internet connection devices available at the location where the stenographer is taking data can be used to facilitate quick and inexpensive translation of stenographic data without having to store the translation software on the stenographer's machine 1.

When the device 1 has an integrated word processing system, then the functions of dictation, translation, and editing of the translation can be performed by the stenographer on a single machine.

The device 1 can also include a multi-media recorder 11 that can store, in a memory 3, digital video images and/or audio data. By recording the audio and/or video of the subject(s) of the stenographer on the device, it becomes possible to associate a portion of the multi-media file with a stenographic stroke. Such recording and coordination of stenographic and video and/or audio data allows the stenographer to playback images of and/or sounds from the subject to assist in the accurate translation of the stenographic keystrokes. Such multi-media data can also be transmitted to other computers and/or locations through network connections, for example, over the Internet, by wireless connections, such as Bluetooth, by direct connections, such as RS-232, universal serial bus, IRDA, Firewire, or by any other available data communications measures to assist the stenographer in accurate translation of the stenographic data.

If a stroke registered by the device is not in the user's stenographic dictionary, an internal algorithm of the translator 5, 6 can be activated to add and/or remove shadowed keys from the stroke until a stenographic match is found for the particular key(s) activation, somewhat like a closest-match routine known in the art of spell-checking devices. Thus, where a partial key actuation (shadow) occurs and the keystroke is not translatable, the shadowed keystroke can be combined with other similar stenographic keystrokes and, along with a spelling and grammar checking device, and can be corrected to fix a mis-stroke or can provide the stenographer with a list of various possible translations for that mis-stroke, which list would be examined by the stenographer at a later time, i.e., when the stenographic dictation breaks or at another location entirely.

Figure 10:
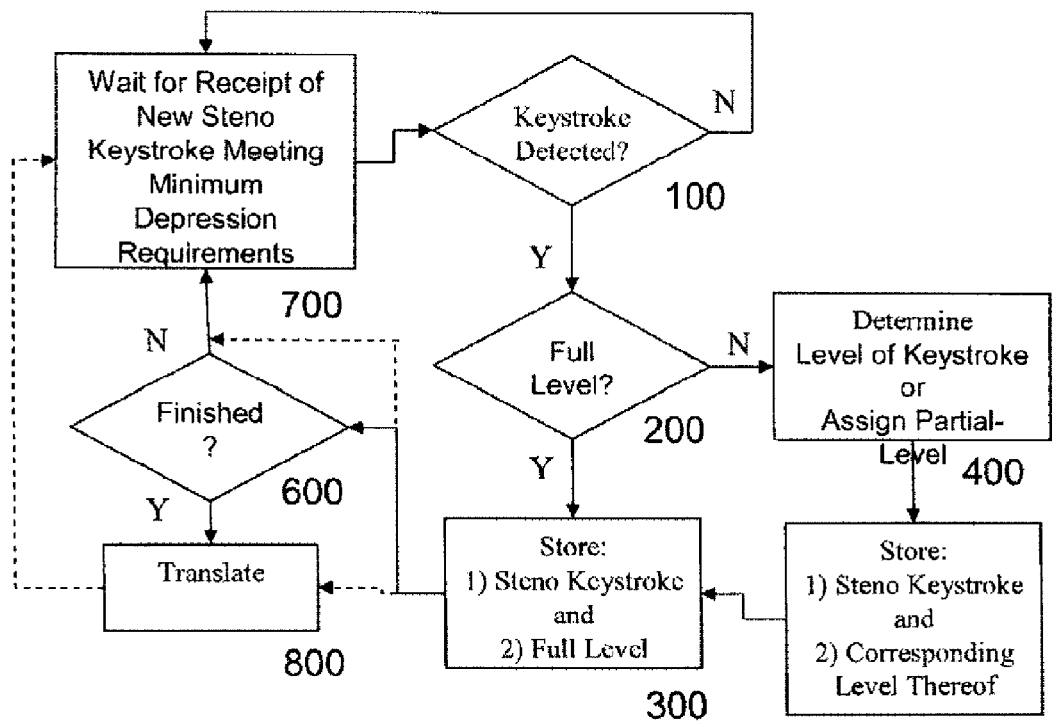
FIG. 10 is a flow chart illustrating a first embodiment of the method for assigning shadows according to the invention.

A first exemplary method for interpreting a depth of the keystroke is illustrated with respect to the flowchart of FIG. 10. In Step 100, a query is performed to determine if a stroke has been detected. If a stroke has been detected, then, in Step 200, the level of the stroke is determined, in other words, whether or not the stroke is a shadow stroke. If the level is determined to be full (complete actuation of the keystroke), then, the corresponding stenographic stroke with or without a full-level indicator is/are stored/transcribed in Step 300. If the level of the stroke is determined to be partial, then two possibilities occur. If the system is only configured to register a full stroke or a partial-stroke, then, in Step 400, the just-received stenographic stroke is indicated as being a partial-level (shadow), and the corresponding stenographic keystroke and a shadow indicator are stored/transcribed in Step 500. If, however, the system is configured to detect more than just one partial-level, the corresponding actuation level is detected and the appropriate shadow is determined along with the detection of the just-received stenographic stroke in Step 400. In such a case, the corresponding stenographic stroke and shadow level are stored/transcribed in Step 500.

A query is made in Step 600 to determine if stroke entry is finished (which, for example, may be indicated by a separate input from the stenographer or by depressed keys passing the registration point upon release). If the answer is no (e.g., the default situation), then, the device 1 waits in Step 700 for the receipt of a new stroke (meeting a predefined minimum keystroke depth requirement).

Registering of a keystroke is detected in Step 100 by a change transmitted by a keystroke device sensor, e.g., in an analog voltage or by a digital position indicator. In a digital system, the depth of the keystroke is translated into a digital numeric value. The value can have more than three variations or can be a tertiary value, including on, off, and shadow. Subsequently, the value is translated into a visual indicator for the corresponding shadow or full value, the indicator including color, shade, font style, position, and/or size of the symbol that represents the actuated key or set of keys (these examples being only representative of possible visual display characteristics). If the stenographer is finished entering keystrokes (i.e., end of the job), then the keystrokes are translated in Step 800. It is noted that translation can be in real-time and, therefore, the circuit of Steps 100 to 700 can be repeated continuously and occur in parallel with translation. In such a configuration, Step 600 would be omitted and the dashed arrows in FIG. 10 would be performed instead.

Figure 11:
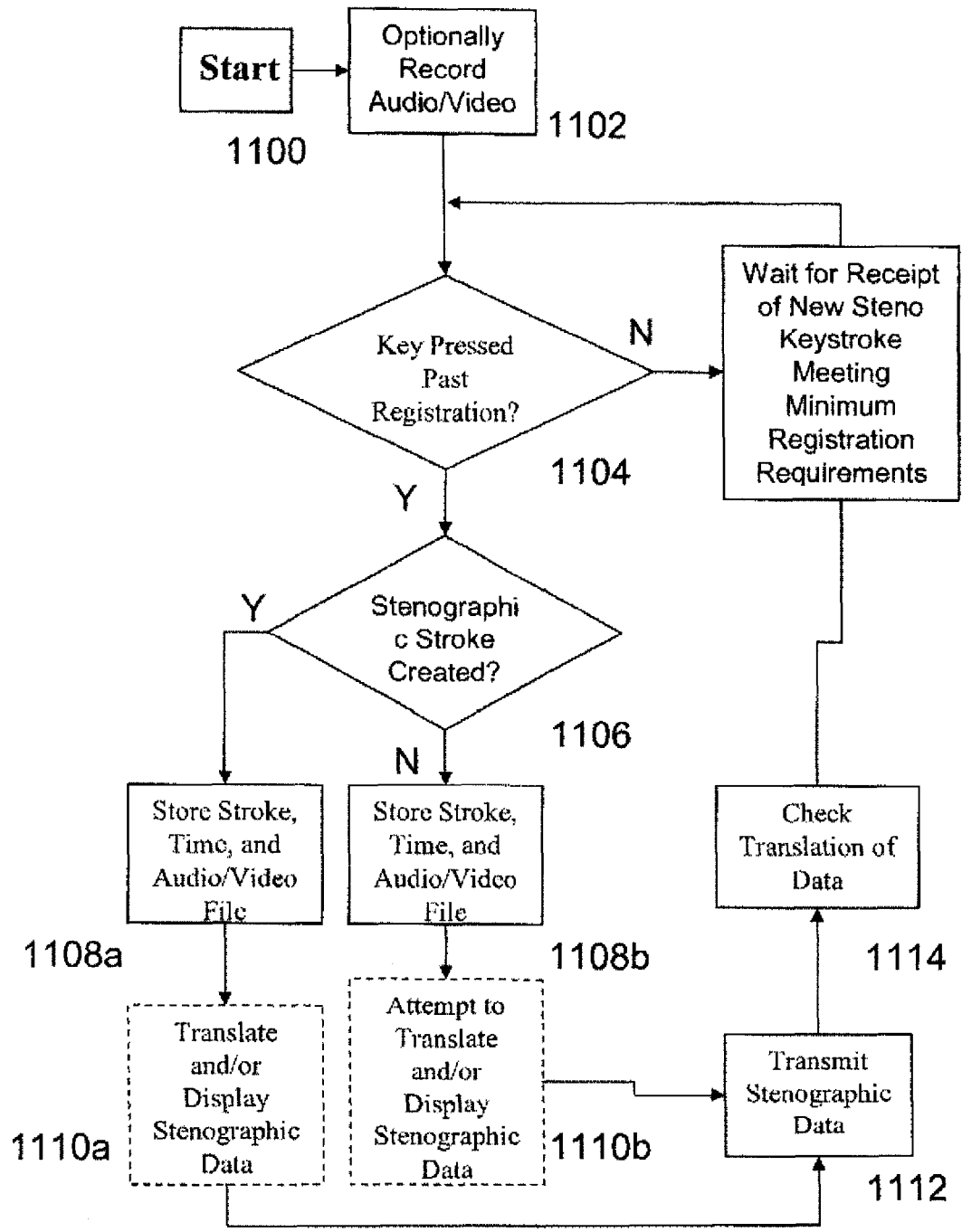
FIG. 11 is a flow chart illustrating a second embodiment of the method for assigning shadows according to the invention.

A second exemplary method for interpreting depth of the keystroke is illustrated with respect to the flowchart of FIG. 11. In Step 1100, the stenographic dictation begins. In Step 1102, audio and/or video of the proceedings to be stenographed are recorded electronically, which recording is an option to be selected by the stenographer. In Step 1104, a query is performed to determine if any key has been pressed past its registration point. If not, the system waits until this event occurs. In Step 1106, a query is performed to determine if all keys that are past the registration point create a recognizable stenographic stroke.

If the answer is yes, then, in Step 1108*a*, the time of the recognizable stroke is recorded and stored with the stenographic data in a mass storage device and/or internal memory and the audio and/or video data file is also stored along with information regarding the location in the data file of the stored stenographic data. Accordingly, the user can go back to the stenographic stroke and correct any errors in transcription by examining the relevant video and/or audio. It is optional, in Step 1110*a*, to pass the stored stenographic stroke to an internal translator and/or to produce a text display.

If the answer is no and a recognizable stenographic stroke is not created, then an attempt to produce a recognizable stroke is performed based upon all of the keys that passed the registration point in combination with any partial key presses that did not reach registration point but were pressed in some way. Specifically, in Step 1108*b*, the time of the unrecognizable stroke is recorded and stored with the stenographic data in a mass storage device and/or internal memory and the audio and/or video data file is also stored along with information regarding the location in the data file of the stored stenographic data. Accordingly, the user can go back to the stenographic stroke and correct any errors in transcription by examining the relevant video and/or audio. In Step 1110*b*, the unrecognizable stroke is passed to an internal translator to find a likely match or a set of possible matches. A text display can be made and/or a suitable signal (beep) can occur to notify the user that a potential error in transcription has occurred. The user can view the stroke, which will include any partial key presses identified by a different color, intensity of color, font, and/or size. If possible (because transcription is still occurring), the user can select the appropriate translation from the suggestions in real time.

In Step 1112, the stenographic data is transmitted to an external translator through some communications link, e.g., RS-232, USB, Network, Bluetooth, Firewire, WIFI, or any other data transmission measures. Optionally, in Step 1114, an external translator can check the translation data and relay that data through an available output device, such as an RS-232 port or network connection to an external display device such as a computer. This process is repeated until dictation is complete.

It is noted that the optional recording of audio and/or video data allows CIC and permits the user to track the stenographic data with the corresponding audio/video data and, thereby, correct any incorrect stenographic translation.

Other possible uses for the keystroke device 10 according to the invention include musical instruments. In one example, the volume of the note would increase or decrease based upon a level of the output signal. In another example, the volume of the note would increase dependent upon a rate of change of the signal (velocity).

In addition to the above-described features, the present invention provides a method and device for identifying and correcting stenographic problems referred to as "stacking" and "splitting." As set forth herein, "stacking" refers to a situation where multiple keys pressed at the same or substantially the same time are erroneously recorded as a single keystroke. Splitting, on the other hand, refers to a situation where one keystroke is recorded as two keystrokes.

The present invention is able to recognize a stacking or splitting condition and interpret the intended keystroke. In general, the invention recognizes two or more keys moving downward at the same time and assumes that they are part of the same keystroke, even if some of those keys started their downward travel at a different time. Likewise, if some of the keys are released before all the keys traveling downward at the same time have reached the bottom of the stroke, the invention assumes that they are part of the same keystroke.

Figure 12:
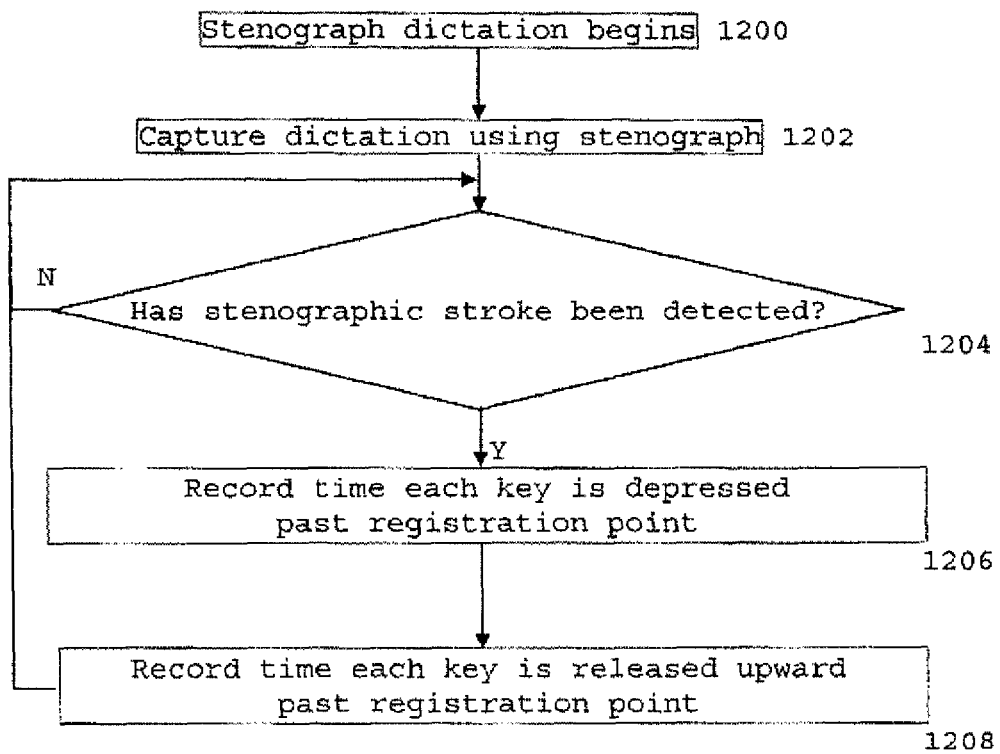
FIG. 12 is a process flow chart illustrating a first process of an embodiment of a method for sensing and correcting stacking and splitting.
Figure 13:
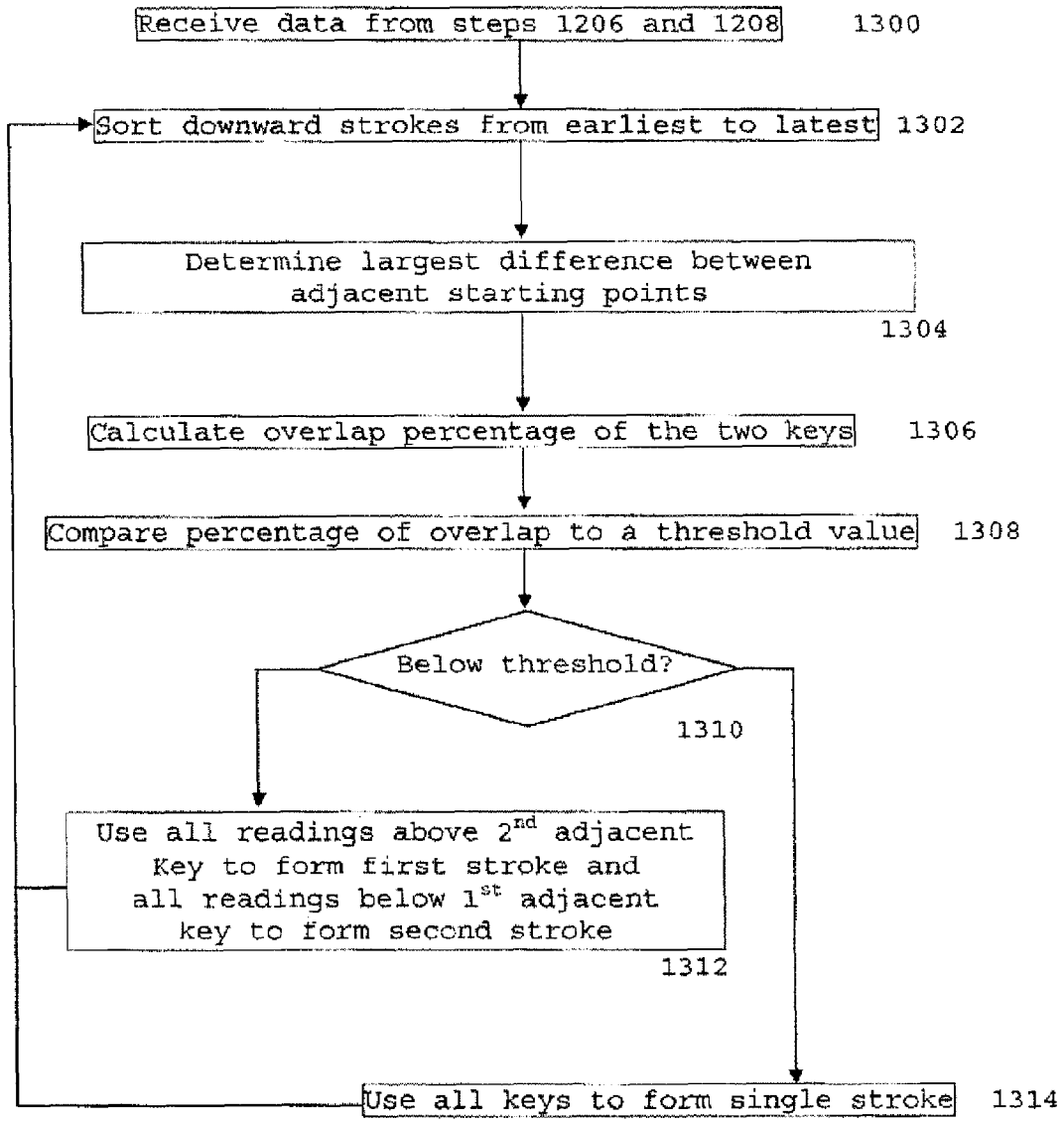
FIG. 13 is a process flow chart illustrating a second process of an embodiment of a method for sensing and correcting stacking and splitting.

The details of the presently inventive method of avoiding stacking and splitting is explained in conjunction with diagrams 1-8 and the process flow charts of FIGS. 12 and 13. In the following diagrams, the character "D" represents a key going down past the registration point and the character "U" represents the same key moving back up past the registration point. The "registration point" is a position between a fully un-depressed or released state and a fully depressed state of a key. The registration point can be detected by physical sensors, optical sensors, or others. The optical sensor can detect a registration point when light is detected, absence of light is detected, of some value in between. In one embodiment, a membrane with an optical gradient is introduced between a light source and a photo detector and when the light level reaches a predefined level, the registration point it recognized. When the key is pressed sufficiently far enough to register as a key press, the registration point has been passed by the key. In the diagrams, each "-" character is a sensor reading. A longer line of "-" characters represents a longer period of time. Further, each of the following diagrams is an example of two keys being sensed, however, as discussed and shown below, the invention is not limited to only two keys:

Diagram 1:
1---D===U-------------
2-------------D====U---

Diagram 1 illustrates the second key (indicated with numeral "2") being depressed after the first key has passed the registration point (in a downward direction) and, then, has returned past the registration point again (in an upward direction). In this situation, both the prior art and in the present invention register these two strokes as separate keystrokes.

Diagram 2:
1----D=========U-----
2-------D====U-------

Diagram 2 illustrates a second-depressed key both traveling downward past the registration point and returning upward through the registration point before a first-depressed key has returned upwards through the registration point. In this situation, both the prior art and in the present invention register these two strokes as a single keystroke.

Diagram 3:
1-----D=======U------
2-------D=======U----

Diagram 3 shows a situation where the first key is depressed and, very shortly thereafter, a second key is depressed. Then, the first key is released shortly before the second key is released. This situation falls in between the examples shown in Diagrams 1 an 2 and, although it is likely that one stroke was intended, in the prior art, stacking or splitting occurs because it is not clear what was intended by the reporter.

Diagram 4:
1----D=======U-------
2----------D=======U-

Diagram 4 shows a situation where the first key is depressed and, some time thereafter, a second key is depressed. Here, as compared to Diagram 3, the time between depression of the first stroke and the second stroke is longer. Then, the first key is released substantially before the second key is released. This situation also falls in between the situations shown in Diagrams 1 and 2 and, although there is a greater time separation between the keystrokes and it is likely that one stroke was intended, in the prior art, stacking or splitting occurs because it still is not completely clear what was intended by the reporter.

The difference between Diagrams 3 and 4 is only in the amount of overlap. The presently inventive method of correctly interpreting keystrokes monitors the amount of time that transpires between the downstroke registration and the registration of the upstroke of the same key. A stack is determined if the overlap of two keystrokes, which can include multiple keys, is below a certain percentage of an overlap of two identified key depression times. In one embodiment, this percentage value is user-definable.

It is easy to recognize that the stacking and splitting problems shown in Diagrams 1-4 quickly grows more complex when more than two keys are involved. However, the present invention provides a device and efficient method for determining whether a stacked or split keystroke has been recorded. This method is illustrated in the process flowcharts of FIGS. 12 and 13.

Referring first to FIG. 12, in Step 1200, stenographic dictation begins and, in Step 1202, a user captures the dictation using a stenographic machine. In Step 1204, a query is performed to determine if a stroke has been detected. The present invention improves stenographic functionality by continuously monitoring the downward and upward keystrokes. While continuously detecting for a stroke, both downward and upward, the sensor records, in Step 1206, the time at which each key travels downward past the registration point. Next, in Step 1208, the sensor records the time in which each key travels upward past the registration point. When the last key travels upward past the registration point, the flow proceeds back up to Step 1204 and waits for the next stroke to occur.

Diagrams 5 and 6 show two example collections of multiple keys being depressed that could be collected and graphed using the information obtained in Steps 1206 and 1208 of FIG. 12.

Diagram 5:
```
----D========U-----
1-D========U---------
2-------D========U---
-----D======U--------
-------D=======U----
---D======U---------
```

Diagram 6:
```
-D========U--------
1-D======U---------
2-------D=======U---
---D=====U----------
--D======U----------
---------D======U---
```

In both Diagrams 5 and 6, two of the sensor readings, 1 and 2, are labeled to illustrate the operation of the present invention. Sensor readings 1 and 2 are the same in both samples. To the eye, one can tell that the sample strokes of Diagram 6 "look" like two keystrokes, while Diagram 5 looks like one stroke that is a bit erratically spread out over time. The spreading out of Diagram 5 can happen if the user is hitting a particularly difficult stroke and has to "work" with his/her hands to position all of the fingers in the right place.

FIG. 13 illustrates a separate process that begins after Step 1208 of FIG. 12. To positively determine what keystrokes were intended in Diagrams 5 and 6, the present invention sorts the readings from earliest to latest, according to when the keys moved past the registration point. Of course, the sorting can also be from latest to earliest or any other sorting methods that properly arrange the keystrokes.

The flow of FIG. 13 begins at Step 1300 where the data is received from Step 1208. In Step 1302, the data is analyzed and transformed by sorting the downward strokes, in this case, from earliest to latest in time. Diagrams 7 and 8 show the sorted data of Diagrams 5 and 6, respectively.

Diagram 7:
```
1--D======U---------
2---D======U---------
3----D========U-----
4-----D=====U--------
5-------D=======U----
6--------D=======U---
```

Diagram 8:
```
1-D========U--------
2--D======U---------
3--D=====U----------
4---D=====U----------
5--------D======U---
6---------D=====U---
```

After performing the sort in Step 1302, the two adjacent readings with the largest difference between starting points is determined in Step 1304. In both exemplary Diagram 7 and exemplary Diagram 8, readings 4 and 5 have the largest difference.

After the readings have been determined in Step 1304, the overlap percentage of the two keys is calculated in Step 1306. In other words, a query is performed to determine how much of the first key's depressed time was shared with the second key's depressed time. In Step 1308, the determined percentage of overlap is compared to a predetermined overlap threshold value. The predetermined overlap threshold can be user definable through an interface or, alternatively, hard coded in the query. If the overlap percentage is below the threshold, indicating a lack of correlation, all of the readings above the second adjacent key (keys 1 through 4 in this example) are used in Step 1310 to form the intended first keystroke and all of the readings below the first adjacent key (keys 5 and 6) are used to form a second keystroke. In the example diagrams above, Diagram 7 produces one stroke and Diagram 8 produces two strokes. The process then moves back up to Step 1302.

Alternatively, if the overlap percentage determined in Step 1308 is above the threshold, indicating correlation of the keys, all of the keys are used in Step 1312 to form a stroke. The process then moves back up to Step 1302. Of course, the present invention can be performed on a combination of only two key strokes. Such a determination of key strokes, in the case of only two keys, would not require steps 1302 and 1304 because there are only two key depression times to analyze.

A device, method, and computer program product has been disclosed automatically detects and corrects stenographic keystrokes that previously resulted in stacking or splitting. The present invention advantageously reduces mistakes and improves accuracy and efficiency of stenographic reporters.

What is claimed is:

1. A method for analyzing multiple keystrokes in an electronic stenographic recording machine having keys forming stenographic keystrokes when actuated, which comprises:
   sensing a depressed state of a first stenographic key and recording a first depression time;
   sensing a depressed state of a second stenographic key and recording a second depression time;
   sensing a released state of the first stenographic key and recording a first release time;
   sensing a released state of the second stenographic key and recording a second release time;
   determining an elapsed depression-release time for each of the first and second stenographic keys;
   determining a percentage of chronological overlap of each of the elapsed depression-release times; and
   separating the first and second key depressions into separate stenographic keystrokes when the percentage of chronological overlap indicates a lack of correlation between the first and second key depressions.

2. The method according to claim 1, which further comprises defining the first and second key depressions as a single stenographic keystroke when the percentage of chronological overlap indicates correlation.

3. The method according to claim 1, which further comprises:
   sensing a depressed state of a third stenographic key and recording a third depression time;
   sensing a released state of the third stenographic key and recording a third release time;
   sorting the first, second, and third depression times based on a chronological order of occurrence;
   determining, within the sorted depression times, a pair of chronologically adjacent depression times with a greatest chronological variation therebetween;
   determining an elapsed depression-release time for each one of the determined pair of adjacent depression times; and
   carrying out the separating step by separating the first, second, and third key depressions into one of:
      three separate stenographic keystrokes when the percentage of chronological overlap indicates a lack of correlation for all of the first, second, and third key depressions; and
      two separate stenographic keystrokes when the percentage of chronological overlap indicates correlation among two of the first, second, and third key depressions and a lack of correlation by one of the first, second, and third key depressions.

4. The method according to claim 3, which further comprises defining the first, second, and third key depressions as a single stenographic keystroke when the percentage of chronological overlap indicates correlation among all of the first, second, and third key depressions.

5. The method according to claim 3, which further comprises carrying out the separating step to create the two separate stenographic keystrokes by:
forming a first of the two separate stenographic keystrokes from the keys having the depressed state chronologically preceding and including the key with the earlier one of the pair of chronologically adjacent depression times; and
forming a second of the two separate stenographic keystrokes from the keys having the depressed state chronologically following and including the key with the later one of the pair of chronologically adjacent depression times.

6. The method according to claim 1, wherein the depressed state is entered when a depressed one of the keys travels downward past a respective registration point.

7. The method according to claim 6, wherein the released state is entered when a released one of the keys travels upward past the respective registration point.

8. The method according to claim 1, wherein the depressed and released states are determined at least in part by an optical sensor.

9. A method for analyzing multiple keystrokes in an electronic stenographic recording machine having keys forming stenographic keystrokes when actuated, the method comprising:
recording a plurality of downward time markers, each of the downward time markers indicating a time when a different one of at least three stenographic keys moves downward past a respective stenographic key registration point;
recording a plurality of upward time markers, each of the upward time markers indicating a time when a different one of the at least three stenographic keys moves upward past its respective key registration point to register a respective key stroke;
chronologically sorting the downward time markers;
determining, within the plurality of sorted downward time markers, a pair of chronologically adjacent downward time markers with a greatest chronological difference therebetween;
determining an elapsed time for each one of the determined pair of adjacent downward time markers, the elapsed time being defined to start when a respective one of the stenographic keys moves downward past its registration point and to end when the respective one stenographic key moves upward past its registration point;
determining a percentage of chronological overlap of the determined elapsed times; and
separating the at least three key strokes into at least two separate stenographic keystrokes when the percentage of chronological overlap indicates a lack of correlation among the at least three key strokes.

10. The method according to claim 9, which further comprises defining the at least three key strokes as a single stenographic keystroke when the percentage of chronological overlap indicates correlation among all of the at least three key strokes.

11. The method according to claim 9, wherein the stenographic key registration point is between a fully released state and a fully depressed state of a key.

12. The method according to claim 9, which further comprises sensing one of the at least three stenographic keys moving past its registration point with an optical sensor.

13. The method according to claim 9, which further comprises carrying out the separating step by:
forming a first of the two separate stenographic keystrokes from the keys having the downward time marker chronologically preceding and including the key with the earlier one of the pair of chronologically adjacent downward time markers; and
forming a second of the two separate stenographic keystrokes from the keys having the downward time marker chronologically following and including the key with the later one of the pair of chronologically adjacent downward time markers.

14. A computer program product for analyzing multiple keystrokes in an electronic stenographic recording machine having keys forming stenographic keystrokes when actuated, the computer program product comprising:
a non-transitory storage medium readable by a processing circuit and storing instructions for execution by the processing circuit for performing a method comprising:
recording a plurality of downward time markers, each of the downward time markers indicating a time when a different one of at least three stenographic keys moves downward past a respective stenographic key registration point;
recording a plurality of upward time markers, each of the upward time markers indicating a time when a different one of the at least three stenographic keys moves upward past its respective key registration point to register a respective key stroke;
chronologically sorting the downward time markers;
determining, within the plurality of sorted downward time markers, a pair of chronologically adjacent downward time markers with a greatest chronological difference therebetween;
determining an elapsed time for each one of the determined pair of adjacent downward time markers, the elapsed time being defined to start when a respective one of the stenographic keys moves downward past its registration point and to end when the respective one stenographic key moves upward past its registration point;
determining a percentage of chronological overlap of the determined elapsed times; and
separating the at least three key strokes into at least two separate stenographic keystrokes when the percentage of chronological overlap indicates a lack of correlation among the at least three key strokes.

15. The computer program product according to claim 14, wherein the method further comprises defining the at least three key strokes as a single stenographic keystroke when the percentage of chronological overlap indicates a correlation among all of the at least three key strokes.

16. The computer program product according to claim 14, wherein each registration point is between a fully released state and a fully depressed state of a key.

17. The computer program product according to claim 14, wherein the method further comprises carrying out the separating step by:
forming a first of the two separate stenographic keystrokes from the keys having the downward time marker chronologically preceding and including the key with the earlier one of the pair of chronologically adjacent downward time markers; and forming a second of the two separate stenographic keystrokes from the keys having the downward time marker chronologically following and including the key with the later one of the pair of chronologically adjacent downward time markers.

18. An electronic stenographic recording machine comprising:
- a set of stenographic keys operable to form stenographic keystrokes when actuated;
- a memory;
- a processor;
- a sensor communicatively coupled to at least one of the memory and the processor and operable to:
  - sense a depressed state of a first stenographic key in the set of stenographic keys and cause the processor to store a first depression time in the memory;
  - sense a depressed state of a second stenographic key in the set of stenographic keys and cause the processor to store a second depression time in the memory;
  - sense a released state of the first stenographic key and cause the processor to store a first release time in the memory; and
  - sense a released state of the second stenographic key and cause the processor to store a second release time in the memory; and
- the processor being operable to:
  - determine an elapsed depression-release time for each of the first and second stenographic keys;
  - determine a percentage of chronological overlap of the elapsed depression-release times; and
  - separate the first and second key depressions into two separate stenographic keystrokes when the percentage of chronological overlap indicates a lack of correlation between the first and second key depressions.

19. The electronic stenographic recording machine according to claim 18, wherein the processor is further operable to define the first and second key depressions as a single stenographic keystroke when the percentage of chronological overlap indicates correlation between the first and second key depressions.

20. The electronic stenographic recording machine of claim 18, wherein:
- the sensor is operable to:
  - sense a depressed state of a third stenographic key in the set of stenographic keys and cause the processor to store a third depression time in the memory;
  - sense a released state of the third stenographic key and cause the processor to store a third release time in the memory;
- the processor is further operable to:
  - sort the first, second, and third depression times based on a temporal order of occurrence;
  - determine, within the plurality of sorted depression times, a pair of chronologically adjacent depression times with a greatest chronological variation therebetween;
  - determine an elapsed depression-release time for each one of the determined pair of adjacent depression times; and
  - to carry out the separating step by separating the first, second, and third key depressions into at least two separate stenographic keystrokes when the percentage of chronological overlap indicates a lack of correlation among the first, second, and third key depressions.

* * * * *